United States Patent
Chen et al.

(10) Patent No.: US 11,995,325 B2
(45) Date of Patent: May 28, 2024

(54) MODULAR SYSTEM DYNAMIC RENDERING CONTROLLER

(71) Applicant: Dell Products L.P., Round Rock, TX (US)

(72) Inventors: Charlotte Chen, Newton, MA (US); Veeresh Radder, Bangalore (IN); Avigail Matalon, Omer (IL); Deepak Abraham, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 2 days.

(21) Appl. No.: 17/863,477

(22) Filed: Jul. 13, 2022

(65) Prior Publication Data
US 2024/0020028 A1    Jan. 18, 2024

(51) Int. Cl.
*G06F 3/06* (2006.01)
(52) U.S. Cl.
CPC .......... *G06F 3/0629* (2013.01); *G06F 3/0604* (2013.01); *G06F 3/0673* (2013.01)

(58) Field of Classification Search
CPC ..... G06F 3/0673; G06F 3/0629; G06F 3/0604
USPC ......................................................... 711/154
See application file for complete search history.

(56) References Cited

U.S. PATENT DOCUMENTS

| 10,042,624 B2 * | 8/2018 | Byrnes | H04L 67/34 |
| 2021/0109671 A1 * | 4/2021 | Shabi | G06F 3/0653 |

* cited by examiner

*Primary Examiner* — Hua J Song
(74) *Attorney, Agent, or Firm* — Krishnendu Gupta; Nikhil Patel (57) ABSTRACT

One or more aspects of the present disclosure relate to dynamically rendering one or more views of a modular system. In embodiments, views of a computing device can be dynamically rendered. For example, the views can be dynamically rendered in response to receiving metadata corresponding to the computing device or receiving a metadata change. Further, the views can show the computing device's components and their relationships to other storage array components and elements. For example, the views can map each component's positional relationship with, e.g., the computing device's rack. Additionally, the views can map cable connections and types of the components.

16 Claims, 5 Drawing Sheets

MODULAR SYSTEM DYNAMIC RENDERING CONTROLLER

BACKGROUND

A storage array is a data storage system for block-based storage, file-based storage, or object storage. Rather than store data on a server, storage arrays use multiple drives in a collection capable of storing a vast amount of data. Storage arrays can include a central management system that manages the data and delivers one or more distributed storage services for an organization. Organizations can require distinct or custom storage array configurations. For example, a financial institution can use storage arrays to collect and store financial transactions from its local banks (e.g., bank account deposits/withdrawals). In contrast, a game developer can use a storage array to host online video games. Accordingly, such storage arrays can have customized setup and installation requirements.

SUMMARY

In one aspect, a method includes dynamically rendering a view of a computing device that maps a configuration for each of the computing device's components in response to receiving metadata corresponding to the computing device or receiving a metadata change.

In embodiments, the method can also include receiving metadata and metadata changes corresponding to a storage array and one or more of its components. Further, the computing device can include the storage array. The method can also include parsing technical configuration information from the metadata and metadata changes corresponding to the array. In addition, the method can include identifying the storage array's components using the parsed technical configuration information.

In embodiments, the method can also include generating a base image object using at least a portion of the technical configuration information.

In embodiments, the method can also include analyzing at least one portion of the technical configuration information, defining physical coordinates corresponding to one or more of: the storage array, the storage array's components, and each part of the storage array and its components using the technical information, where the physical coordinates include a width (w) and height (h) corresponding to one or more of: the storage array, the storage array's components, and each part of the storage array and its components.

In embodiments, the method can also include generating the base image object as an empty scalable vector graphic defining the height and width of at least the storage array or one or more of its racks. Further, the method can include generating a location mapping that translates the defined physical coordinates to image-related coordinates.

In embodiments, the method can also include mapping each storage array rack to its corresponding storage array component defined by the metadata and the metadata changes and dynamically layering a base component image object on top of the base image object using the location mapping.

In embodiments, the method can also include identifying each part corresponding to each of the storage array's components using the parsed technical information and dynamically layering a part image object on top of its corresponding base component image object at an image coordinate defined by the metadata and the metadata changes.

In embodiments, the method can also include dynamically rendering a layered image object using the base image object, base component image object, and part image object.

In embodiments, the method can also include identifying cable connection types and image coordinates for each cable connection interface of the storage array, rack, and component's parts defined by the metadata and the metadata changes.

In embodiments, the method can also include identifying cable types based on the cable connector types. Additionally, the method can include dynamically rendering end-to-end cable connections on the layered image object based on the identified cable types and each cable-connection interface's corresponding image coordinates for each cable defined by the metadata and the metadata changes.

In another aspect, a system is configured to dynamically render a view of a computing device that maps a configuration for each computing device's components in response to receiving metadata corresponding to the computing device or receiving a metadata change.

In embodiments, the system can also be configured to receive metadata and metadata changes corresponding to a storage array and one or more of its components. Further, the computing device can include the storage array, parse technical configuration information from the metadata and metadata changes corresponding to the array, and identify the storage array's components using the parsed technical configuration information. Other technical features can be readily apparent to one skilled in the art from the following figures, descriptions, and claims.

In embodiments, the system can be configured to generate a base image object using at least a portion of the technical configuration information.

In embodiments, the system can further be configured to analyze at least one portion of the technical configuration information. Further, the system can be configured to define physical coordinates corresponding to the storage array, its components, each part of the storage array, and each component's part using the technical information. Additionally, the physical coordinates can include a width (w) and height (h) corresponding to the storage array, the storage array's components, and each part of the storage array and its components.

In embodiments, the system can be configured to generate the base image object as an empty scalable vector graphic, defining the height and width of at least the storage array or one or more of its racks. Additionally, the system can be configured to generate a location mapping that translates the defined physical coordinates to image-related coordinates.

In embodiments, the system can further be configured to map each storage array rack to its corresponding storage array component defined by the metadata and the metadata changes and dynamically layer a base component image object on top of the base image object using the location mapping In embodiments, the system can further be configured to identify parts corresponding to each storage array's components using the parsed technical information. Further, the system can be configured to dynamically layer a part image object on top of its corresponding base component image object at an image coordinate defined by the metadata and the metadata changes.

In embodiments, the system can be configured to dynamically render a layered image object using the base image object, base component image object, and part image object.

In embodiments, the system can further be configured to identify cable connection types and image coordinates for each cable connection interface of the storage array, rack, and component's parts defined by the metadata and the metadata changes.

In embodiments, the system can be configured to identify cable types based on the cable connector types. Further, the system can be configured to dynamically render end-to-end cable connections on the layered image object based on the identified cable types and each cable-connection interface's corresponding image coordinates for each cable defined by the metadata and the metadata changes.

Other technical features can be readily apparent to one skilled in the art from the following figures, descriptions, and claims.

DETAILED DESCRIPTION

A business like a financial or technology corporation can produce large amounts of data and require sharing access to that data among several employees. As such, these companies often use storage arrays that deliver block-based storage, file-based storage, or object storage. Because a storage array uses multiple storage drives (e.g., hard-disk drives (HDD) and solid-state drives (SSD)), a company can scale (e.g., increase or decrease) and manage storage capacity more efficiently than storage solutions delivered by a server. In addition, a company can use a storage array to read/write data required by one or more business applications.

However, each business can have unique requirements and thus, require customized storage array configurations. For example, a financial entity, like a bank, likely has different requirements and uses of a storage array than a social media company, like Facebook®. Accordingly, there are no one-size-fits-all storage array solutions that can satisfy each storage array customer's needs. Thus, vendors can deliver each customer a highly-customizable modular storage solution. In addition, given the high-level customization options, vendors can deliver large quantities of storage arrays with different architectural and hardware configurations. Consequently, vendors cannot create installation and configuration information (e.g., manuals, specifications, and instructions) specific to every possible storage array configuration.

Therefore, embodiments of the present disclosure dynamically deliver real-time information (e.g., technical architecture, configuration, setup, and related installation information) for configuring a storage array. For example, embodiments of the present disclosure can dynamically render storage array views, illustrating information for installing and configuring a storage array.

Figure 1:
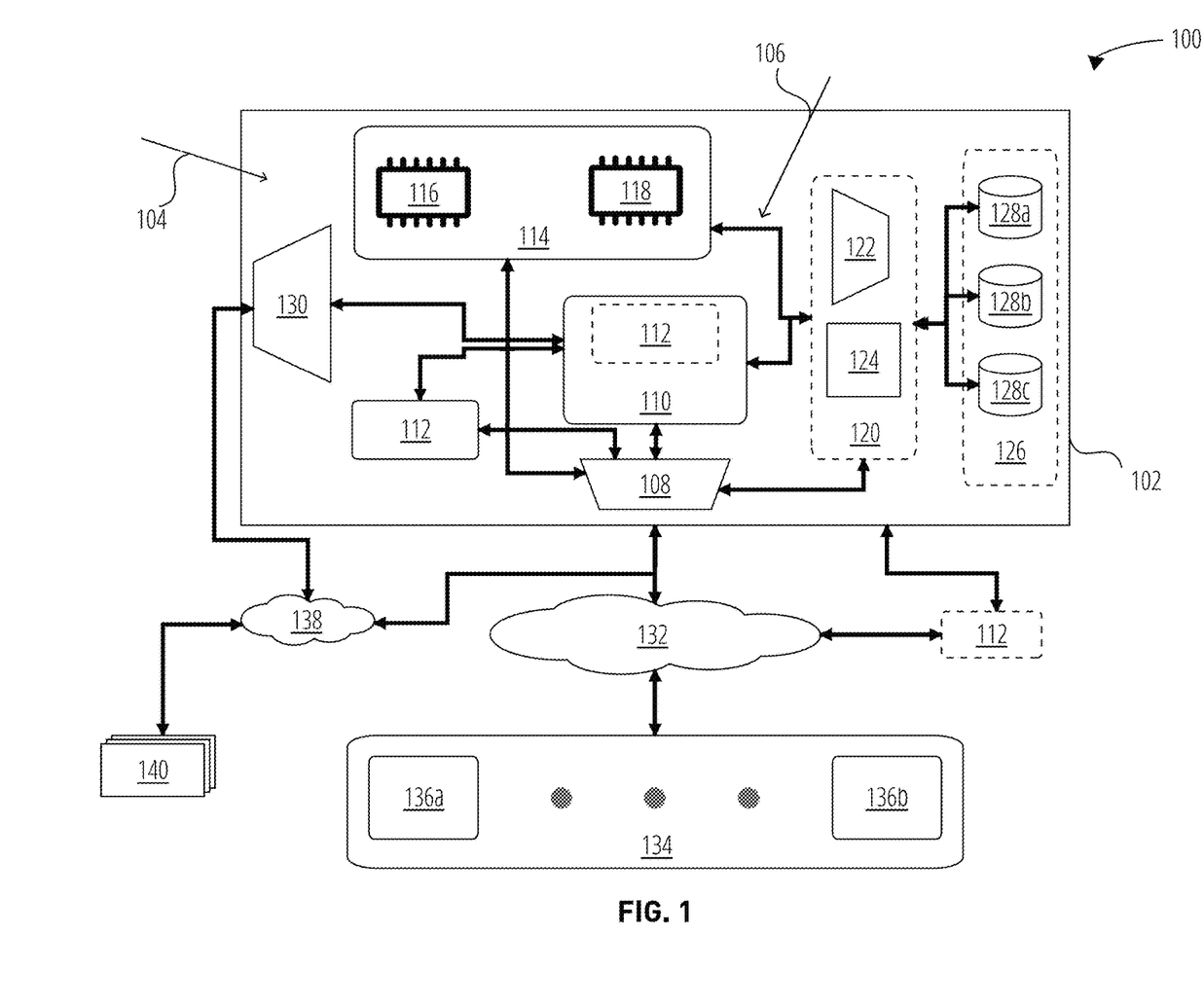
FIG. 1 illustrates a distributed network environment that includes a storage array in accordance with embodiments of the present disclosure.

Regarding FIG. 1, a distributed network environment 100 can include a storage array 102, a remote system 140, and hosts 134. In embodiments, the storage array 102 can include components 104 that perform one or more distributed file storage services. In addition, the storage array 102 can also include one or more internal communication channels 106 106 that communicatively couple the components 104. For example, the communication channels 106 can include Fibre channels, busses, communication modules, and the like.

In embodiments, the storage array 102, components 104, remote system 140, and hosts 134 can include a variety of proprietary or commercially available single or multi-processor systems (e.g., parallel processor systems). The single or multi-processor systems can include central processing units (CPUs), graphical processing units (GPUs), and the like. Additionally, the storage array 102, remote system 140, and hosts 134 can virtualize one or more of their respective physical computing resources (e.g., processors (not shown), memory 114, and storage devices 126).

In embodiments, the storage array 102 and two or more devices can form a network 132. For example, the network 132 can link the devices via a communication medium like cables, telephone lines, radio waves, satellites, or infrared light beams. Thus, the linked device, collectively, can form the network 132. Further, the network 132 can form a storage area network (SAN), local area network (LAN), wide area network (WAN) (e.g., the Internet), Explicit Congestion Notification (ECN), an Enabled Ethernet network, and the like. The storage array 102 and a remote system 140 can establish a remote network (RN 138). Furthermore, network 132 and the RN 138 can include communication nodes that enable network communications. For example, the communication nodes can include switching equipment, phone lines, repeaters, multiplexers, satellites, and the like. Moreover, one or more network bridges or link(s) can enable cross-network communications between network 132 and the RN 138.

The network 132 or the RN 138 can have a SAN architecture that allows the storage array 102 and other networked devices (e.g., the hosts 134 and remote system 140) to send/receive electronic communications using a communications protocol. The communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like. Further, the storage array 102 and other networked devices can connect to the network 132 or the RN 138 via a network interface. The network interface can include a wired/wireless connection interface, bus, data link, and the like. For example, the storage array 102 can include a host adapter (HA) 108 that connects the storage array 102 to the network 132 (e.g., SAN). The storage array 102 can also include a remote adapter (RA) 130 that connects the storage array 102 to the RN 138.

In embodiments, the storage array 102 and its components 104 can process input/output (IO) workloads received from the network 132 or the RN 138 from networked devices (e.g., the hosts 134). An IO workload can include one or more IO requests or operations (e.g., read/write requests or other storage service-related requests) from the hosts 134 or the remote system 140. For example, hosts 134 can include client machines 136a-136b with one or more applications that require one or more of the storage array's services.

Accordingly, each application can send one or more IO requests to the storage array 102. Additionally, each IO request can include instructions for reading data from or writing data to the array's memory 114 or storage drives 128a-128c.

In embodiments, the storage array 102 can include a memory 114 that stores instructions a processor can execute to perform one or more storage-related operations. Additionally, the memory 114 can include volatile or nonvolatile memory. Further, the memory 114 can include random access memory (RAM), dynamic RAM (DRAM), static RAM (SRAM), and other similar memory types. Moreover, each memory type can have distinct performance characteristics (e.g., speed corresponding to reading/writing data).

In embodiments, the memory 114 can include global memory (GM 116) and local memory (LM 118) that cache data to enable the execution of one or more storage-related services as described herein. The memory 114, GM 116, and LM 118 can include register memory, shared memory, constant memory, user-defined memory, and the like. Further, the GM 116 can include cache memory, and the LM 118 can include the array's primary memory.

In embodiments, the storage array 102 can deliver distributed storage solutions to the hosts 134 using storage devices 126. The storage devices 126 can include storage drives 128a-128c. The storage drives 128a-128c can include a hard disk drive (HDD), solid-state drive (SSD), and the like. Accordingly, each storage drive 128a-128c can have distinct performance characteristics (e.g., read/write speeds).

In embodiments, the storage array 102 can include a host adapter (HA 108), e.g., a Fibre Channel Adapter (FA) and the like, that manages the IO requests from hosts 134. For example, the storage array 102 can cache the 10 request's target data in memory 114 (e.g., GM 116). Accordingly, the HA 108 can direct the 10 requests to the array's Enginuity Data Services processor (EDS 110) that manages access requests to the array's memory 114. In other examples, the storage array 102 can store the IO request's target data in one or more storage devices 126 (e.g., storage drives 128a-128c). Accordingly, the HA 108 can direct the 10 requests to the array's device interface 120. For example, the device interface 120 can include a disk adapter (DA 122) and a flash interface 124 that manage access requests to one or more of the array's storage devices 126.

In embodiments, a service level agreement (SLA) can define at least one Service Level Objective (SLO) the hosts 134 require from the storage array 102. For example, each application executed by the hosts 134 can generate or require data with distinct importance levels. Therefore, the SLO can group the data into corresponding distinct data category levels. Further, the SLO can specify a service level (SL) for each data category level, defining each SL's distinct performance requirement (e.g., a response time and uptime).

In embodiments, the EDS 110 can perform one or more self-optimizing techniques (e.g., one or more machine learning techniques) that deliver performance, resource availability, data integrity services, and the like. Further, the EDS 110 can establish a storage and memory hierarchy based on the SLA and the performance capabilities of the array's memory and storage drives 128a-128c.

In embodiments, the storage array 102 can include a design controller 112 with, e.g., logic or circuitry elements that perform one or more storage-related services. For example, the design controller 112 and its elements can have an architecture designed to dynamically render one or more configuration views of the storage array 102, as described in greater detail herein.

In addition to residing within the storage array 102, the design controller 112 and its elements can reside external to the storage array 102 or within the one or more components 104 (e.g., EDS 110). When external from the storage array 102, the design controller 112 can communicate with the storage array 102 using any known communication connections. For example, the communications connections can include a serial port, parallel port, network interface card (e.g., Ethernet), and the like.

Figure 2:
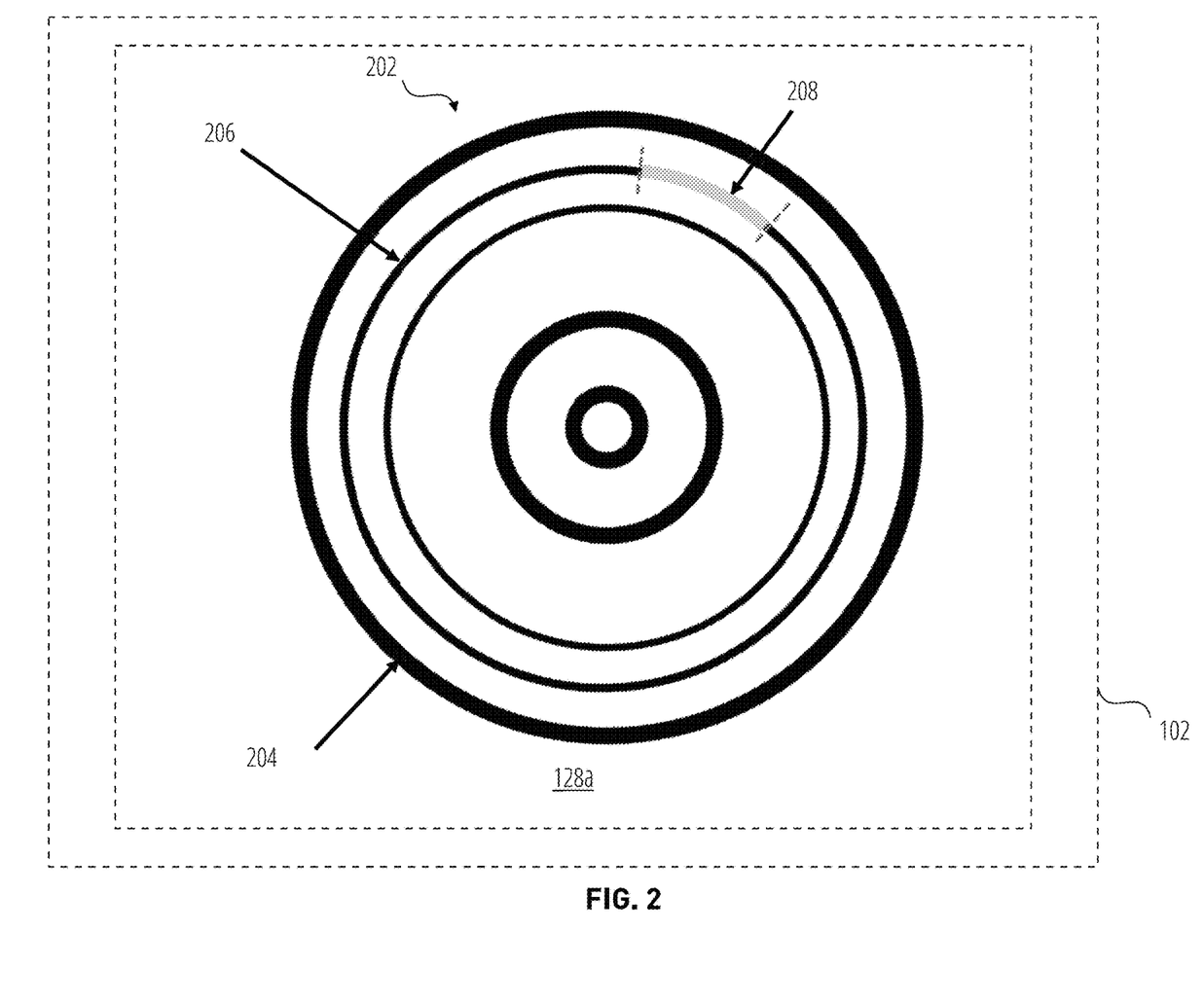
FIG. 2 is a cross-sectional view of a storage device in accordance with embodiments of the present disclosure.

Regarding FIG. 2, the storage array 102 can persistently store data on one of its storage devices 126 (e.g., storage drive 128a). The storage drive 128a can include an HDD 202 with stacks of cylinders 204. Additionally, each cylinder 204, like a vinyl record's grooves, can include one or more tracks 206. Accordingly, the storage array 102 can store data on at least one track portion (e.g., sector 208). Another drive, e.g., storage drive 128c, can include an SSD (not shown). Although HDD and SSD are persistent storage devices, each can have different performance characteristics. Specifically, an HDD architecture is known by skilled artisans to be slower than an SSD's architecture. Likewise, the array's memory 114 can include different memory types, each with distinct performance characteristics described herein.

In embodiments, the EDS 110 of FIG. 1 can establish a storage or memory hierarchy based on the SLA and the performance characteristics of the array's storage devices 126 and memory 114. For example, the EDS 110 can establish the hierarchy to include one or more tiers (e.g., subsets of the array's storage and memory) with similar performance capabilities (e.g., response times and uptimes). Thus, the EDS-established fast memory and storage tiers can service host-identified critical and valuable data (e.g., Platinum, Diamond, and Gold SLs). In contrast, slow memory and storage tiers can service host-identified non-critical and less valuable data (e.g., Silver and Bronze SLs). Additionally, the EDS 110 can define "fast" and "slow" performance metrics based on relative performance measurements of the array's storage devices 126 and memory 114. Accordingly, the EDS 110 can define corresponding threshold limits using the relative performance measurements.

In embodiments, the EDS 110 can virtualize the array's physical memory 114 and storage devices 126. Specifically, the EDS 110 can virtualize the array's storage and memory resources by generating logical representations of physical slices or portions of the memory 114 or storage devices 126. For example, the EDS 110 can establish a virtual storage drive using zero or more portions of each storage drive 128a-128c. Further, the EDS 110 can assign a logical unit number (LUN) to the virtual storage drive. For example, the EDS 110 can define a logical block address (LBA) that logically represents, e.g., physical address spaces of a drive's sector 208.

In embodiments, the EDS 110 can establish logical tracks (e.g., track identifiers (TIDs) by creating LBA groups, where each LBA can correspond to any of the storage devices 126. For example, the EDS 110 can establish a virtual storage drive (e.g., a logical unit number (LUN)) by creating TID groups. Further, the EDS 110 can generate a searchable data structure, mapping logical storage representations to their corresponding physical address spaces.

In embodiments, the EDS 110 can further establish a storage and memory hierarchy using the SLA. For example, the EDS 110 can generate storage and memory tiers, where each tier includes storage and memory allocations with similar characteristics (e.g., performance capabilities). Specifically, the EDS 110 can define each tier using the logical memory and storage representations and related physical device characteristics. For instance, the EDS 110 can establish fast memory and storage tiers that service host-identified critical and valuable data and slow memory and storage tiers that service host-identified non-critical and low-value data. Additionally, the SLA can define performance ranges (e.g., min/max response and uptimes) for one or more data categories.

For example, the SLA can assign critical, valuable, and important data categories to the faster SLs (e.g., Platinum, Diamond, or Gold SLs) while assigning the non-critical and low-value data categories to the slower SLs (e.g., Silver and Bronze). Accordingly, the EDS 110 can assign each storage and memory tier to SLs by comparing each tier's performance characteristics to each SL's performance requirements. Further, the HA 108 can present the hosts 134 with the logical memory and storage representations based on host or application performance requirements.

Figure 3:
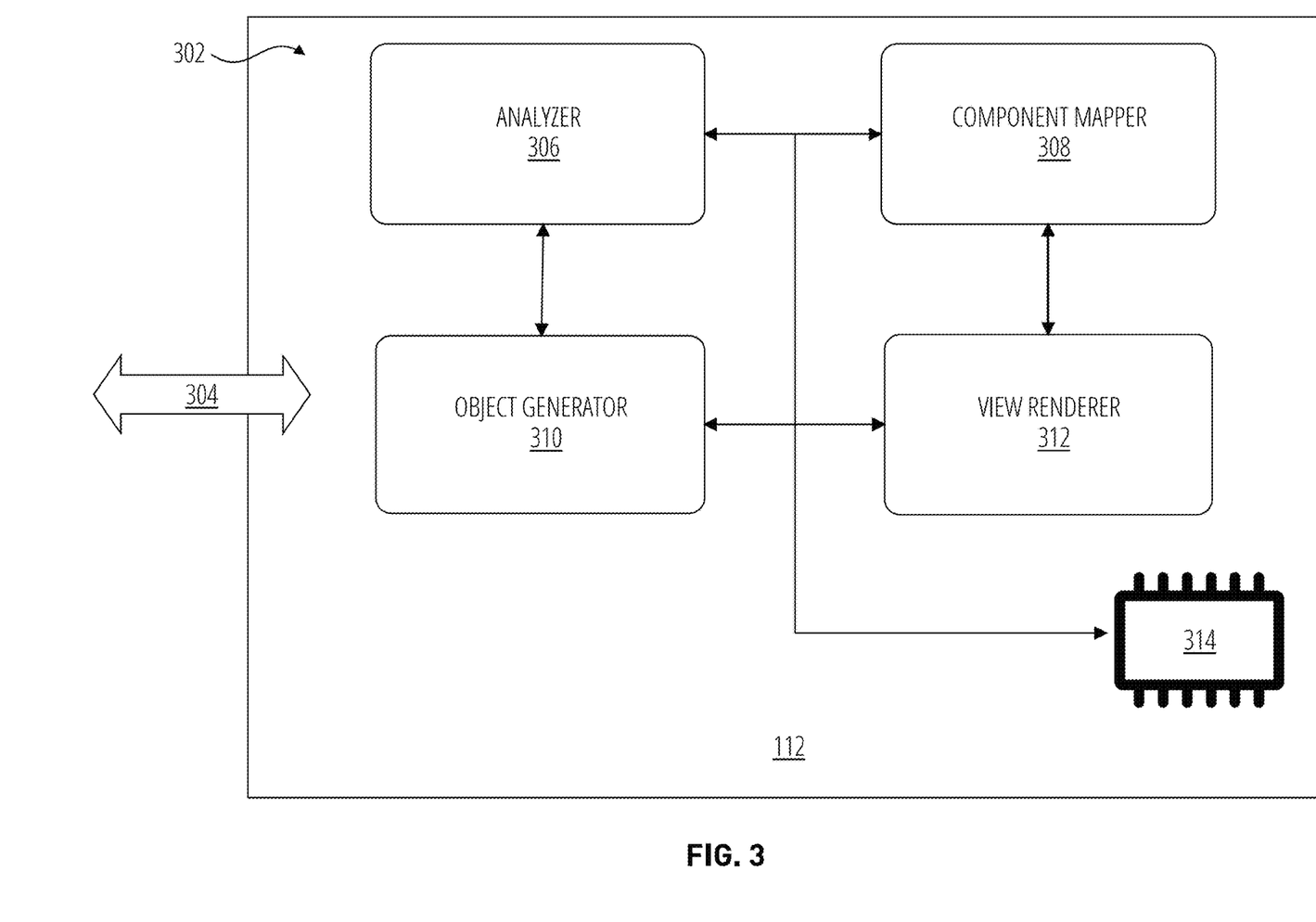
FIG. 3 is a communications block diagram related to the controller in accordance with embodiments of the present disclosure.

Regarding FIG. 3, a design controller 112 can include one or more logic/circuitry elements 302 configured to deliver real-time information, including dynamically rendered content for installing and configuring a storage array.

In embodiments, the design controller 112 can receive data 304, including storage array architecture/design information. For example, the design controller 112 can render a graphical user interface (GUI) that receives custom storage array architecture/design information. Specifically, the architecture/design information can include system configurations, component/hardware information, field replaceable unit (FRU) lists, cable connection types, cable types, and U locations, amongst other related installation and configuration information.

In embodiments, the design controller 112 can include an analyzer 306 with hardware/software elements configured to process the data 304 to generate configuration and hardware policies. Using the configuration and hardware rules, the analyzer 306 can establish a system model that maps the storage array system configuration to its components (e.g., the FRUs). For instance, the system model can define the storage array's attributes such as its layout, rack type, number, and component types, amongst other related attributes. Further, the model can include hardware rules defining requirements such as power supply and other relationships and requirements. Specifically, the other relationships and requirements can correspond to unconfigured elements like the power supply (e.g., rack-specific elements).

In addition, the analyzer 306 can generate cable connection rules using information including the array's system configuration and hardware rules. The cable connection rules can define the cable characteristics, including cable types, length, gauge, and connection mappings, amongst other related cable characteristics related to the system model's specified rack. Further, the analyzer 306 can store the data 304, attributes, and rules, amongst other received and generated information in the design controller's LM 118 (i.e., local memory).

In embodiments, the design controller 112 can include a component mapper 308 that includes hardware/software elements with an architecture that can generate component objects corresponding to, e.g., the components 104 of FIG. 1. For example, the component mapper 308 can obtain the array's system information and model, amongst other related data 304 from the LM 118. Specifically, the component mapper 308 can generate a system map that associates the array's system information/model to its corresponding rack and rack view. For instance, the LM 118 can store a searchable data structure that maps rack views to unique rack identifiers (e.g., rack names and serial numbers). Accordingly, the component mapper 308 can search the data structure (e.g., using a unique rack identifier) to locate the model-specified rack data 304 defining the rack's physical dimensions.

Further, the component mapper 308 can obtain the screen dimensions of a host-operated display or GUI based on, e.g., metadata received from a host-issued IO. Accordingly, the component mapper 308 can generate, e.g., a rack object map, defining instructions for generating a rack scalable vector graphic (SVG) or similar scalable image type using the screen dimensions and the rack's physical dimensions. Specifically, the component mapper 308 can compare the screen and rack dimensions to generate a positional vector object (PVO). The PVO can define rules for generating a rack SVG scaled from the rack's physical dimensions to fit within the host-operated display/GUI screen.

In embodiments, the component mapper 308 can further generate FRU/component objects using the system map and related data 304. Specifically, the system map can define each FRU's/component's physical u-position (e.g., the precise location where an FRU/component resides in the specified physical rack), their corresponding physical dimensions, and port/connection types, amongst other related information. Thus, the component mapper 308 can use the system map to generate FRU/component objects defining positional relationships with a specified rack.

Further, the component mapper 308 can define cable-to-component connection objects using the cable connection rules and the FRU/component objects. The cable-to-component objects can define relationships between cable/connection types and FRUs/components. Specifically, the component mapper 308 can generate the FRU/component objects to include FRU/component cable connection coordinates using the data 304. Thus, the component mapper 308 can generate the cable-to-component objects to include connection point coordinates for each end of the object's corresponding cable type. Additionally, the component mapper 308 can store the objects in the system map and the LM 118.

In embodiments, the design controller 112 can include an object generator 310 that can generate scalable vector graphics (SVGs) using the system map and corresponding objects generated by the component mapper 308. For example, the object generator 310 can pre-generate base SVG images using the system map. Specifically, the object generator 310 can pre-generate SVG image groups with SVG rack and FRU/component images sized to corresponding common screen/GUI base dimensions. Accordingly, the object generator 310 can further determine which common screen/GUI base dimension is best-matched to a host-operated GUI's specific dimensions. Thus, the object generator 310 can select the corresponding pre-generated SVG images from which to generate SVG images scaled to fit the host-operated GUI.

In embodiments, the object generator 310 can also generate an empty base SVG container sized to fit the host-operated GUI. Specifically, the object generator 310 can generate the SVG container using the PVO. Further, the object generator 310 can generate an SVG coordinate map from the empty base SVG container. The SVG coordinate map can map the specified rack's physical dimensions to the base SVG container's image coordinates (e.g., pixel coordinates). Additionally, the SVG coordinate map can define a scaling coefficient (e.g., scaling ratio) for scaling one or more of the pre-generated SVG image groups.

Further, the object generator 310 can use the SVG coordinate map to annotate the objects generated by the component mapper 308 to include corresponding SVG positional coordinates. For example, the rack object can include annotations mapping a scaled version of its base SVG image to the empty base SVG container. Further, the object generator 310 can annotate the FRU/component objects and the cable-to-component objects to include corresponding SVG positional coordinates based on coordinates corresponding to the scaled version of the rack's base SVG image. Further, the object generator 310 can generate scaled SVG images from the annotated objects. Additionally, the object generator can create a searchable index mapping the scaled FRU/component SVG to the scaled rack SVG and their respective SVG image coordinates.

In other embodiments, the object generator 310 can compare the rack's PVO and SVG coordinate map with the rack's corresponding physical dimensions. Based on the comparison, the object generator 310 can establish vector scaling rules (VSRs) that include instructions for scaling an FRU/component's physical dimensions to the rack's PVO/SVG coordinate map. Additionally, the object generator 310 can annotate the rack's SVG to include interaction points and areas that enable a GUI or a rendering processor (e.g., the view renderer 312) to overlay graphical content on the rack image.

Accordingly, the object generator 310 can generate each FRU/component object to include u-position and physical dimensions. Thus, the object generator 310 can use each FRU/component object to generate corresponding scalable vector graphic (SVG) images (or similar scalable vector image types). Specifically, the object generator 310 can use the rack's VSRs to transform each FRU/component's physical dimensions into corresponding vector image dimensions scaled to the rack's PVO/SVG coordinate map and dimensions. Thus, the object generator 310 can further modify each FRU/component's u-position to corresponding VG-u-positions (vector-graphic u-positions) scaled to the rack's SVG.

In embodiments, the design controller 112 can further include a view renderer 312 that can dynamically render a storage array views of its rack and FRU/components. For example, the view renderer 312 can receive information corresponding to interactions with the GUI. The interaction information can define the storage array configuration and system information.

Then, the view renderer 312 can render a storage array rack overlaid with any scaled FRU/component SVGs identified by the interaction information using the configuration and system information.

The following text includes details of one or more methods or flow diagrams disclosed herein. Each method is depicted and described as one or more acts for context and without limitation. Each act can occur in various orders or concurrently with other acts described herein, or neither presented nor described herein. Furthermore, each act can be optional and, thus, not required to implement each method described herein.

Figure 4:
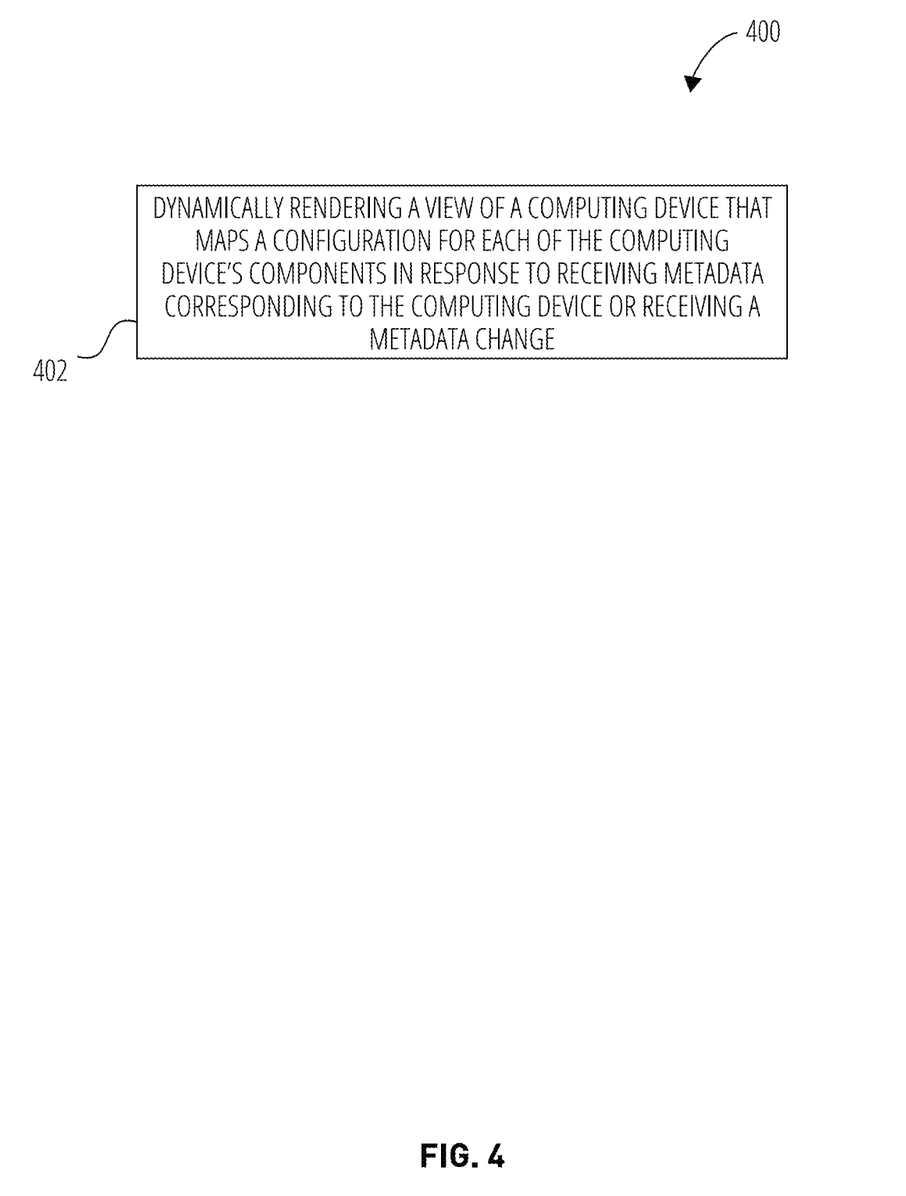
FIG. 4 is a flow diagram of a method for dynamically rendering one or more views of a modular system in accordance with embodiments of the present disclosure.

Regarding FIG. 4, one or more of the array's components 104 can execute a method 400 that includes acts for dynamically rendering one or more views of a modular system. In embodiments, the method 400, at 402, can include rendering a view of a computing device that maps a configuration for each computing device's components in response to receiving metadata corresponding to the computing device or receiving a metadata change. Additionally, each act (e.g., step or routine) of the method 400 can include any combination of the techniques described herein.

Figure 5:
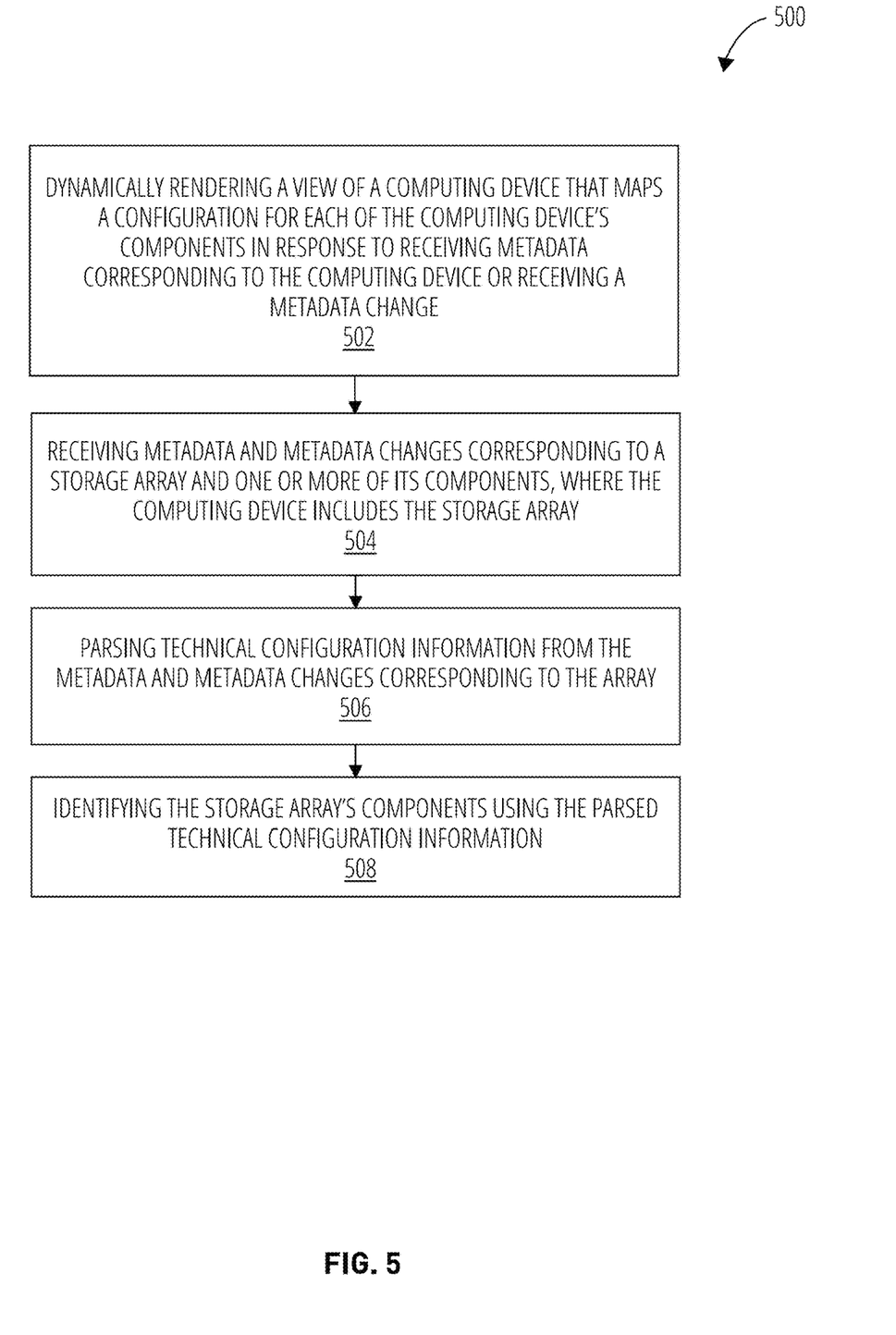
FIG. 5 is a flow diagram of a method for dynamically rendering one or more views of a modular system's components in accordance with embodiments of the present disclosure.

Regarding FIG. 5, one or more of the array's components 104 can execute a method 500 that includes acts for dynamically rendering modular system views. At 502, the method 500 can include dynamically rendering a view of a computing device that maps a configuration for each of the computing device's components in response to receiving metadata corresponding to the computing device or receiving a metadata change. Additionally, at 504, method 500 can include receiving metadata and metadata changes corresponding to a storage array and one or more of its components. In embodiments, the computing device can include the storage array. Further, at 506, method 500 can include parsing technical configuration information from the metadata and metadata changes corresponding to the array. Furthermore, at 508, method 500 can include identifying the storage array's components using the parsed technical configuration information.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special purpose logic circuitry.

A computer having a display device that enables user interaction can implement the above-described techniques such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can provide for interaction with a user. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, wired network(s), or wireless network(s).

The system can include a client(s) and server(s). The client and server (e.g., a remote server) can interact through a communication network. For example, a client and server relationship can arise by computer programs running on the respective computers and having a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based network(s). Circuit-based network(s) can include, for example, a public switched telephone network (PSTN), a private branch exchange (PBX), a wireless network, or other circuit-based network(s). Finally, wireless network(s) can include RAN, Bluetooth, code-division multiple access (CDMA) network, time division multiple access (TDMA) network, and global system for mobile communications (GSM) network.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:
   receiving metadata and metadata changes corresponding to a storage array and one or more of its components, where the computing device includes the storage array;
   parsing technical configuration information from the metadata and metadata changes corresponding to the array;
   identifying the storage array's components using the parsed technical configuration information;
   analyzing at least one portion of the technical configuration information;
   defining physical coordinates corresponding to one or more of the storage array, the storage array's components, and each part of the storage array and its components using the technical information, where the physical coordinates include a width (w) and height (h) corresponding to one or more of the storage array, the storage array's components, and each part of the storage array and its components; and
   dynamically rendering a view of a computing device that maps a configuration for the computing device's components in response to receiving metadata corresponding to the computing device or receiving a metadata change.

2. The method of claim 1, further comprising:
   generating a base image object using at least a portion of the technical configuration information.

3. The method of claim 1, further comprising:
   generating a base image object as an empty scalable vector graphic defining a height and width of at least the storage array or one or more of its racks; and
   generating a location mapping that translates the defined physical coordinates to image-related coordinates.

4. The method of claim 3, further comprising:
   identifying each part corresponding to each of the storage array's components using the parsed technical information; and
   dynamically layering a part image object on top of its corresponding base component image object at an image coordinate defined by the metadata and the metadata changes.

5. The method of claim 1, further comprising:
   mapping each storage array rack to its corresponding storage array component defined by the metadata and the metadata changes; and
   dynamically layering a base component image object on top of the base image object using the location mapping.

6. The method of claim 5, further comprising:
   dynamically rendering a layered image object using the base image object, base component image object, and part image object.

7. The method of claim 6, further comprising:
   identifying cable connection types and image coordinates for each cable connection interface of the storage array, rack, and component parts defined by the metadata and the metadata changes.

8. The method of claim 6, further comprising:
   identifying cable types based on the cable connection types;
   dynamically rendering end-to-end cable connections on the layered image object based on the identified cable types and each cable-connection interface's corresponding image coordinates for each cable defined by the metadata and the metadata changes.

9. A system configured to:

receive metadata and metadata changes corresponding to a storage array and one or more of its components, where the computing device includes the storage array;

parse technical configuration information from the metadata and metadata changes corresponding to the array;

identify the storage array's components using the parsed technical configuration information;

analyze at least one portion of the technical configuration information;

define physical coordinates corresponding to one or more of the storage array, the storage array's components, and each part of the storage array and its components using the technical information, where the physical coordinates include a width (w) and height (h) corresponding to one or more of the storage array, the storage array's components, and each part of the storage array and its components; and dynamically render a view of a computing device that maps a configuration for the computing device's components in response to receiving metadata corresponding to the computing device or receiving a metadata change.

10. The system of claim 9, further configured to:

generate a base image object using at least a portion of the technical configuration information.

11. The system of claim 9, further configured to:

generate a base image object as an empty scalable vector graphic defining a height and width of at least the storage array or one or more of its racks; and generate a location mapping that translates the defined physical coordinates to image-related coordinates.

12. The system of claim 11, further configured to:

identify each part corresponding to each of the storage array's components using the parsed technical information; and dynamically layer a part image object on top of its corresponding base component image object at an image coordinate defined by the metadata and the metadata changes.

13. The system of claim 9, further configured to:

map each storage array rack to its corresponding storage array component defined by the metadata and the metadata changes; and dynamically layer a base component image object on top of the base image object using the location mapping.

14. The system of claim 13, further configured to:

dynamically render a layered image object using the base image object, base component image object, and part image object.

15. The system of claim 14, further configured to:

identify cable connection types and image coordinates for each cable connection interface of the storage array, rack, and component's parts defined by the metadata and the metadata changes.

16. The system of claim 14, further configured to:

identify cable types based on the cable connection types;

dynamically render end-to-end cable connections on the layered image object based on the identified cable types and each cable-connection interface's corresponding image coordinates for each cable defined by the metadata and the metadata changes.

* * * * *